July 5, 1932.  W. M. PAXSON  1,866,269
RAKE CLEANER
Filed March 27, 1931
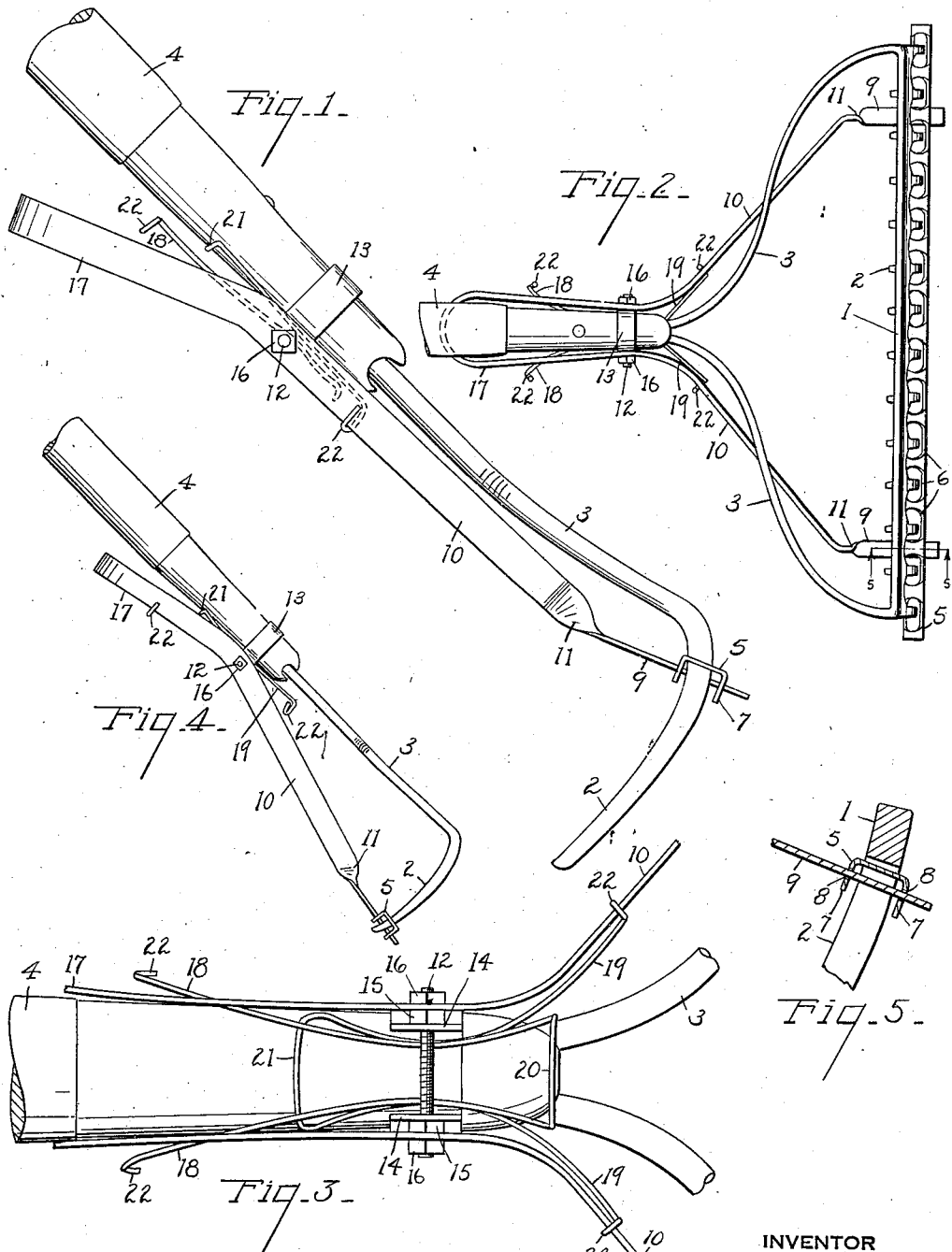
INVENTOR
Willard M. Paxson
BY
Chappell & Earl
ATTORNEYS Patented July 5, 1932

1,866,269

UNITED STATES PATENT OFFICE

WILLARD M. PAXSON, OF DOWAGIAC, MICHIGAN, ASSIGNOR OF ONE-HALF TO DONALD H. MILES, OF CASSOPOLIS, MICHIGAN

RAKE CLEANER

Application filed March 27, 1931. Serial No. 525,727.

The main objects of this invention are to provide a rake cleaner or stripper which may be readily applied to rakes now widely used and of considerable variation in pitch, angle and shape of the teeth and also one which is well adapted either for use as a lawn rake; that is, for raking grass or leaves, or as a garden rake.

A further object is to provide a rake cleaner or stripper embodying these advantages which may be adjusted so that the stripper is automatically urged to outer or stripping or discharging position or yieldingly retained in retracted position.

Objects relating to details and economies of my invention will appear from the description to follow. The invention is defined and pointed out in the claims.

A structure which is a preferred embodiment of my invention is illustrated in the accompanying drawing, in which:

Fig. 1 is a side view of a rake embodying the features of my invention, the handle being partially broken away.

Fig. 2 is a top or plan view with the handle partially broken away.

Fig. 3 is an inverted enlarged fragmentary view showing the mounting of the stripper bar supporting arms and the relation of the springs thereto.

Fig. 4 is a fragmentary side view with the springs arranged to urge the stripper bar outwardly.

Fig. 5 is a fragmentary section on line 5—5 of Fig. 2.

Referring to the drawing, the rake head 1 is provided with curved teeth 2 and with a bar or shank members 3 extending from the ends of the head and detachably engaged or secured to the handle 4. It will be understood that these parts are of a type now extensively used and commonly designated as a garden rake.

The stripper comprises a bar 5 of channel cross section, its web portion having holes 6 through which the teeth are disposed. The flanges 7 of the bar have holes 8 to loosely receive the fingers or pins 9 on the arms 10, so that the stripper bar is floatingly supported on these arms. The arms are formed of flat strips of metal with quarter twists 11 therein providing the pin portions 9.

The arms are mounted on the bolt 12 which constitutes the clamping bolt for the handle embracing clip 13. This clip has spaced ears 14, the adjusting nuts 15 being arranged on the inner sides of the arms 10 while the nuts 16 are arranged on the outer sides thereof so that the bolt serves the double purpose of a clamping bolt and a pivot.

The arms are extended rearwardly beyond the pivot in a downwardly inclined loop 17 which constitutes a handpiece.

Pairs of springs 18, 18 and 19, 19 connected by loops 20 and 21 respectively are disposed between the bolt and the handle, being clamped or retained in position thereby. These springs have hooks 22 at their outer ends which may be selectively engaged with the arms either at the front or the rear of their pivot and thereby yieldingly supporting the stripper bar either in the retracted position shown in Fig. 1, or in the outer or actuated position shown in Fig. 4. In raking grass or leaves, for example, it is advantageous to adust the springs as shown in Fig. 4 while in garden work it is advantageous to adjust the springs as shown in Fig. 1.

The stripper does not interfere with the normal use of the rake but may be brought into use to clean the teeth. The stripper bar being floatingly mounted upon the arms accommodates itself to the particular curve or pitch of the teeth and also permits considerable variation in the positioning of the clip.

Having thus described my invention, what I claim as new and desire to secure by Letters Patent, is:

1. The combination with a rake and handle of a channeled stripper bar having holes in the web portion thereof through which the teeth of the rake are disposed and opposed holes in the flanges thereof adjacent the ends of the bar, a clip embracing the handle and having spaced ears, a clamping and pivot bolt arranged through the ears, a stripper bar support comprising a pair of arms of flat material pivoted on said bolt at the outer sides of said ears and having quarter twists at their front ends providing pin portions loosely engaged in said holes in said stripper bar flanges whereby the stripper is floatingly supported on said arms, said arms being connected by a downwardly inclined loop at the rear of said bolt constituting a handpiece, and pairs of springs connected by loops at their inner ends disposed in opposed relation between said bolt and handle, said springs having hooks at their outer ends detachably and selectively engageable with said arms or said loop.

2. The combination with a rake and handle of a stripper bar, a clip embracing the handle and having spaced ears, a clamping and pivot bolt arranged through the ears, a stripper bar support comprising a pair of arms pivoted on said bolt at the outer sides of said ears, said arms being connected by a downwardly inclined loop at the rear of said bolt constituting a handpiece, and pairs of springs connected by loops at their inner ends disposed in opposed relation between said bolt and handle, said springs having hooks at their outer ends detachably and selectively engageable with said arms or said loop.

3. The combination with a rake and handle of a channeled stripper bar having holes in the web portion thereof through which the teeth of the rake are disposed and opposed holes in the flanges thereof adjacent the ends of the bar, a handle clip, a stripper bar support comprising a pair of arms of flat material pivoted on said clip and having quarter twists at their front ends providing pin portions loosely engaged in said holes in said stripper bar flanges whereby the stripper is floatingly supported on said arms, said arms being connected by a downwardly inclined loop at the rear of said bolt constituting a handpiece, and a spring acting on said arms.

4. The combination with a rake and handle, of a stripper bar, a clip embracing the handle and having spaced ears, a clamping and pivot bolt arranged through the ears, a stripper bar support comprising a pair of arms pivoted on said bolt at the outer sides of the ears and having portions projecting rearwardly of the bolt and constituting a handpiece, and springs in supporting engagement with the bolt and handle having hooks selectively engageable with the arms at the rear side of the bolt.

5. The combination with a rake and handle, of a stripper bar, a handle clip, a support for said stripper bar pivotally mounted on said clip, and a spring supported at a point intermediate its ends by said clip, its ends being detachably engageable with said support at either side of its pivot to yieldingly urge the support in either direction on its pivot.

6. The combination with a rake and handle, of a stripper bar, a clip embracing the handle and provided with a clamping bolt, a stripper bar support pivotally mounted on said bolt and projecting to the rear thereof, and a spring engaged with said bolt and having parts extending to each side thereof selectively engageable with said support.

In witness whereof I have hereunto set my hand.

WILLARD M. PAXSON.